(12) United States Patent
Venturoso

(10) Patent No.: US 12,446,548 B2
(45) Date of Patent: Oct. 21, 2025

(54) DOG EXERCISE AND ENTERTAINMENT TOY

(71) Applicant: Alexander Venturoso, Hacienda Heights, CA (US)

(72) Inventor: Alexander Venturoso, Hacienda Heights, CA (US)

( * ) Notice: Subject to any disclaimer, the term of this patent is extended or adjusted under 35 U.S.C. 154(b) by 0 days.

(21) Appl. No.: 18/619,908

(22) Filed: Mar. 28, 2024

(65) Prior Publication Data

US 2024/0237615 A1 Jul. 18, 2024

Related U.S. Application Data

(63) Continuation-in-part of application No. 17/894,425, filed on Aug. 24, 2022.

(51) Int. Cl.
*A01K 15/00* (2006.01)
*A01K 15/02* (2006.01)

(52) U.S. Cl.
CPC .................. *A01K 15/025* (2013.01)

(58) Field of Classification Search
CPC .... A01K 1/035; A01K 15/025; A01K 15/027; B05B 15/658
USPC .................................. 119/702, 707
See application file for complete search history.

(56) References Cited

U.S. PATENT DOCUMENTS

| | | |
|---|---|---|
| 1,546,714 A | 7/1925 | Buzbee |
| 1,628,993 A | 5/1927 | Olschewski |
| 2,619,381 A | 11/1952 | Jepson |
| 2,620,231 A | 12/1952 | King |
| 2,758,874 A | 8/1956 | Snyder |
| 3,554,166 A * | 1/1971 | Belden ...................... A01J 7/04 119/14.01 |
| 4,235,378 A * | 11/1980 | Melin ..................... A63H 23/10 446/153 |
| 4,787,875 A * | 11/1988 | Baron .................... A63H 33/28 239/289 |
| 5,224,652 A * | 7/1993 | Kessler ................ A63G 31/007 239/211 |
| 5,307,993 A | 5/1994 | Simonetti et al. |
| 6,007,402 A * | 12/1999 | Nelson, II .............. A63H 29/14 446/176 |
| 6,050,501 A * | 4/2000 | O'Rourke ................. B05B 3/00 239/229 |
| 6,558,223 B1 * | 5/2003 | Matthews .............. A63H 33/28 446/159 |
| 6,561,810 B1 * | 5/2003 | Schellhardt ............ G09B 23/12 434/300 |
| 6,848,629 B2 * | 2/2005 | Palmer .................... B05B 17/08 446/187 |
| 9,539,603 B2 | 1/2017 | Tanguay |
| 2004/0092201 A1 * | 5/2004 | Schoonmaker ........ A63H 23/10 446/153 |

(Continued)

*Primary Examiner* — Richard T Price, Jr.
(74) *Attorney, Agent, or Firm* — AGK Patent & Trademark Law; Philip Y Kim

(57) ABSTRACT

A dog toy having a one hose configuration or a two hose configuration having fixed ends connected to a base with an inner chamber that can be filled with water or sand and having plurality of stake holes to firmly stake the base to a ground. The hose includes an inner tube carrying water and an outer tube protecting the inner tube from dog bites. Free hose ends preferably include a nozzle producing a wide spray.

20 Claims, 7 Drawing Sheets

(56) References Cited

U.S. PATENT DOCUMENTS

| | | | |
|---|---|---|---|
| 2004/0164179 A1* | 8/2004 | Corbett | B05B 15/16 239/200 |
| 2009/0114166 A1 | 5/2009 | Saborio et al. | |
| 2015/0007902 A1* | 1/2015 | Ragner | D03D 3/02 138/121 |
| 2022/0193702 A1 | 6/2022 | Liu | |

* cited by examiner

DOG EXERCISE AND ENTERTAINMENT TOY

CROSS-REFERENCE TO RELATED APPLICATIONS

The present application is a Continuation In Part of U.S. patent application Ser. No. 17/894,425 filed Aug. 24, 2022, which application is incorporated in its entirety herein by reference.

BACKGROUND OF THE INVENTION

The present invention relates to animal toys and in particular to a water exercise and entertainment toy for dogs.

Dogs often become bored and destructive, and some breeds need exercise to remain healthy and out of trouble. Various toys have been developed to satisfy this need, but none have been sufficiently successful to be universally accepted.

U.S. Pat. No. 7,997,229 discloses a sprinkler entertaining dogs, but merely sprays a fixed pattern, and state that dog toys with moving hoses will be quickly destroyed by dogs. Toys like that disclosed in the '229 patent fail to attract sufficient interest and may be quickly destroyed.

U.S. patent application Ser. No. 17/894,425 filed Aug. 24, 2022 by the present inventor describes a dog water toy having two hoses reaching up from a "Y" fitting. Unfortunately, the structure of the original design presented issues and a revised design is needed.

BRIEF SUMMARY OF THE INVENTION

The present invention addresses the above and other needs by providing a dog toy having a one hose configuration and a two hose configuration having a fixed end connected to a base with a hollow chamber that can be filled with water or sand to add weight. The hose includes an inner tube carrying water and an outer tube protecting the inner tube from dog bites. Free hose ends preferably include a fan nozzle producing a wide spray.

In accordance with one aspect of the invention, there is provided a dog toy having silicone tubing covered by flexible plastic tubing. The silicone tubing is connected to a base to receive a flow of water and the flexible plastic tubing covers the silicone tubing preventing damage.

In accordance with another aspect of the invention, there is provided a dog toy having a base with an inner chamber to receive water or sand to add weight. The total weight is preferably between four and eight pounds. The base preferably has a length and width of about 250 mm for stability. The hose(s) move in a random pattern and the weighted base prevents the base from falling over during use.

In accordance with another aspect of the invention, there is provided a dog toy having a base with a plurality of stake holes to firmly hold the base to the ground.

In accordance with another aspect of the invention, there is provided a dog toy having nozzles at free ends producing a wide spray. The wide spray presents a challenge to dogs versus a narrow stream spray because there is no single stream for the dogs to chase and wide fan spray is harder for dogs to avoid providing better coverage for cooling on hot days.

In accordance with another aspect of the invention, there is provided a dog toy having light weight hoses providing greater motion.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
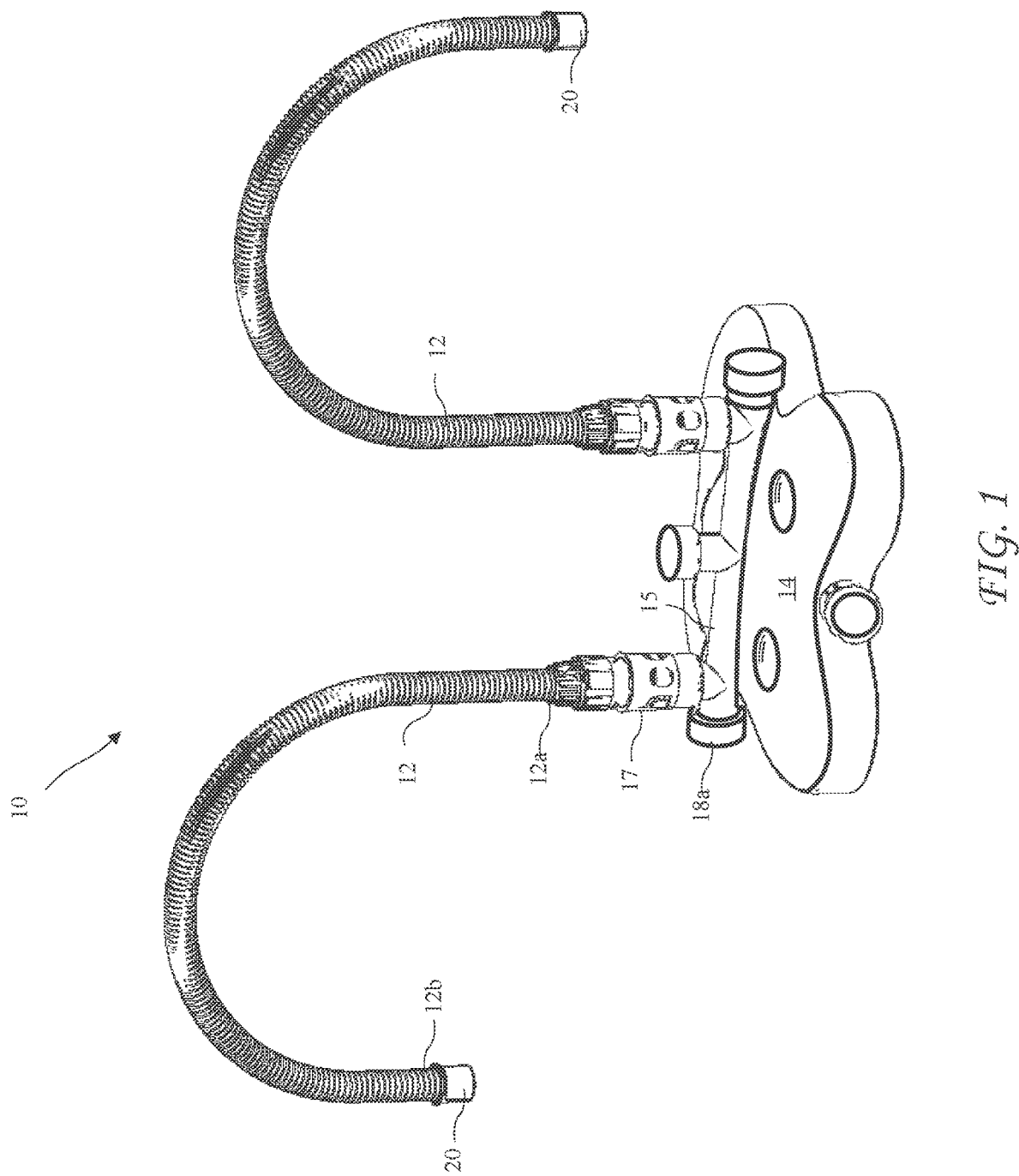
FIG. 1 is a toy for dogs according to the present invention.

A rear perspective view of a double hose version of a toy 10 for dogs according to the present invention is shown in FIG. 1. The toy 10 comprises a base 14, a female garden hose connector 18a for receiving a flow of water, a passage 15 is in fluid communication with the connector 18a, a hose 12, a hose fitting 17 and a fan nozzle 20. The hose 12 may be attached to the base 14 by a quick release fitting 17a or a female hose fitting 17b. The hose 12 has a fixed end 12a attached in fluid communication with the fitting 17 and a free end 12b attached to the fan nozzle 20.

Various views of the base 14 is shown in FIG. 2A to 2E. The base 14 further comprises an interior hollow channel 11, a fill opening 13, the channel 15, a plurality of openings 21 to receive the hose 12, and a plurality of stake holes 16 preferably four. A male garden hose connector 18b of base 14 may be included opposite to the female garden hose connector 18a allowing several toys 10 to be connected in series. A cap 19 may close the male garden hose connector 18b when a single toy 10 is present. The base 14 has a width W1 and a length L. The width W1 is preferably between 240 mm to 260 mm and more preferably is 250 mm. The length L is preferably between 240 mm to 260 mm and more preferably is 250 mm. The height of the center of the hose connectors 18a and 18b from the ground is H. The height is H is preferably 48 mm to 60 mm and more preferably is 54 mm.

Figure 2D:
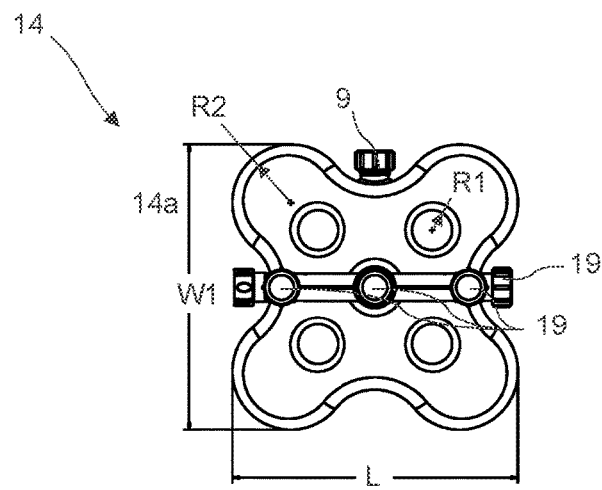
FIG. 2D is a top view of the base of the toy for dogs according to the present invention.
Figure 2B:
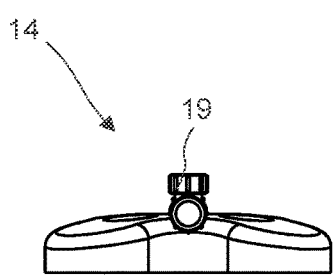
FIG. 2B is a side view of the base of the toy for dogs according to the present invention.
Figure 2A:
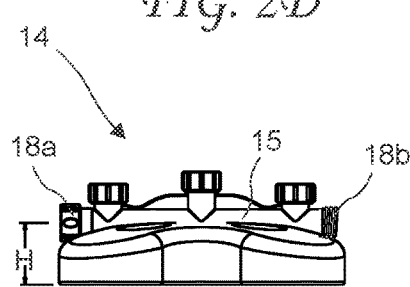
FIG. 2A is a front view of a base of the toy for dogs according to the present invention.
Figure 2C:
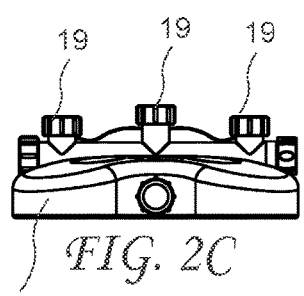
FIG. 2C is a rear view of the base of the toy for dogs according to the present invention.
Figure 2E:
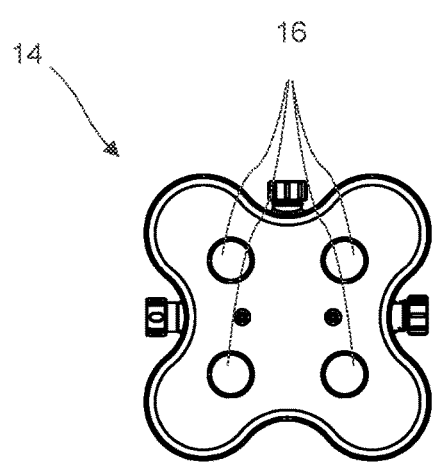
FIG. 2E is a bottom view of the base of the toy for dogs according to the present invention.

The base further comprises an outer perimeter 14a with curved ends as shown in FIG. 2D and FIG. 2E. The outer perimeter 14a having a symmetrical curvature R2. R2 preferably having a radius between 48 to 56 mm and most preferably a radius of 52 mm. The stake holes 16 of base 14 having a radius R1. R1 preferably having a radius between 30 mm to 45 mm and more preferably having a radius of 35 mm.

Figure 3D:
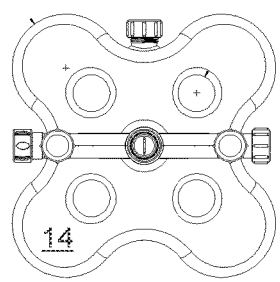
FIG. 3D is a top view of the single hose version of the toy for dogs according to the present invention.
Figure 3B:
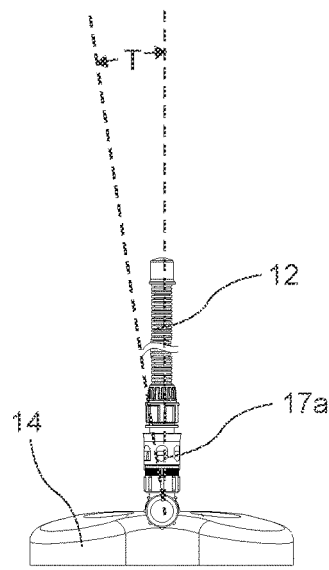
FIG. 3B is a side view of the single hose version of the toy for dogs according to the present invention.
Figure 3A:
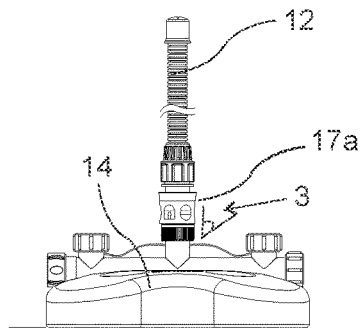
FIG. 3A is a front view of a single hose version of the toy for dogs according to the present invention.
Figure 3C:
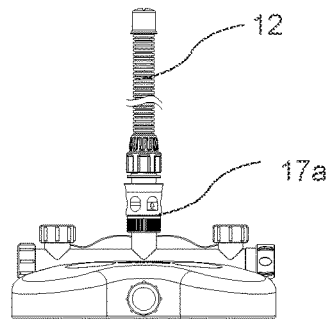
FIG. 3C is a rear view of the single hose version of the toy for dogs according to the present invention.
Figure 3E:
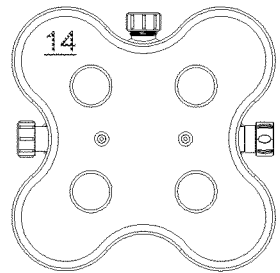
FIG. 3E is a bottom view of the single hose version of the toy for dogs according to the present invention.

FIG. 3A to 3E show the same base 14 configuration as FIG. 2A to 2E. FIG. 3A to 3C show a single hose configuration with the quick hose release fitting 17a. The hose 12 may be vertical or may have a tilt T. The tilt T is preferably less than 20 degrees, more preferably less than 15 degrees, still more preferably less than 10 degrees, and most preferably less than 2 degrees.

Figure 4D:
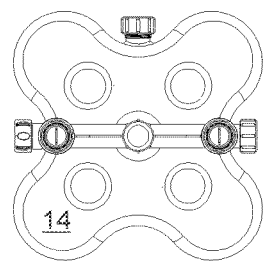
FIG. 4D is a top view of the double hose version of the toy for dogs according to the present invention.
Figure 4B:
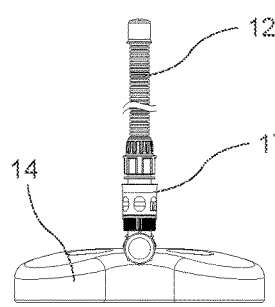
FIG. 4B is a side view of the double hose version of the toy for dogs according to the present invention.
Figure 4A:
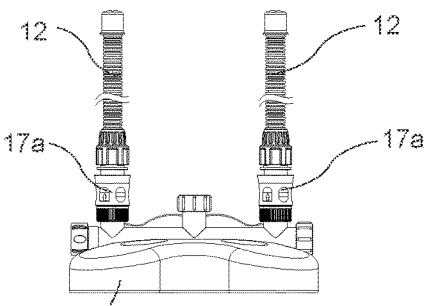
FIG. 4A is a front view of a double hose version of the toy for dogs according to the present invention.
Figure 4C:
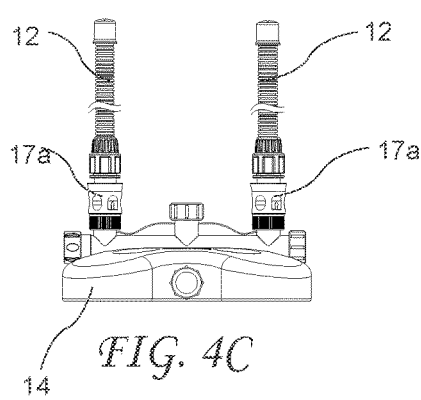
FIG. 4C is a rear view of the double hose version of the toy for dogs according to the present invention.
Figure 4E:
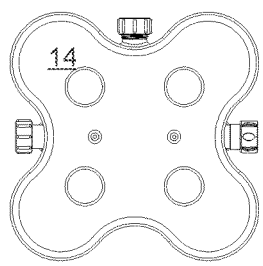
FIG. 4E is a bottom view of the double hose version of the toy for dogs according to the present invention.

FIG. 4A to 4E show the same base 14 configuration as FIG. 2A to 2E. FIG. 4A to 4C show a double hose configuration with the garden hose quick connect fitting 17a. The garden hose quick connect fitting 17a is commonly available from home and garden supplies and may be made from plastic, aluminum, brass, or the like.

Figure 5D:
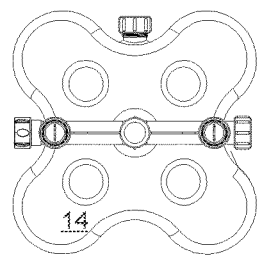
FIG. 5D is a top view of the double hose version of the toy for dogs with a female hose fitting according to the present invention.
Figure 5B:
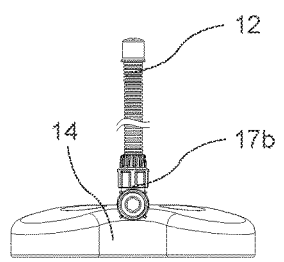
FIG. 5B is a side view of the double hose version of the toy for dogs with a female hose fitting according to the present invention.
Figure 5A:
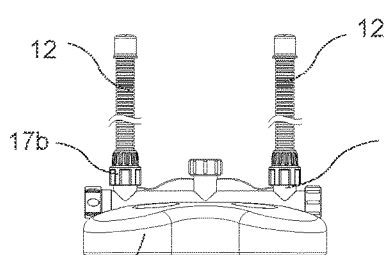
FIG. 5A is a front view of a double hose version of the toy for dogs with a female hose fitting according to the present invention.
Figure 5C:
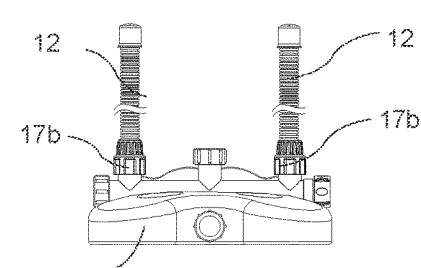
FIG. 5C is a rear view of the double hose version of the toy for dogs with a female hose fitting according to the present invention.
Figure 5E:
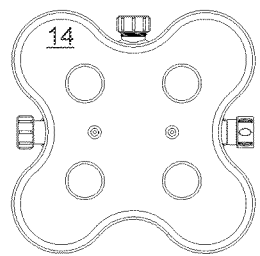
FIG. 5E is a bottom view of the double hose version of the toy for dogs with a female hose fitting according to the present invention.

FIG. 5A to 5E show the same base 14 configuration as FIG. 2A to 2E. FIG. 5A to 5C show a double hose configuration with a female hose fitting 17b.

Figure 6D:
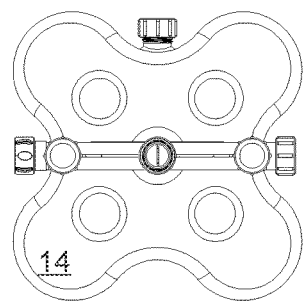
FIG. 6D is a top view of the single hose version of the toy for dogs with a female hose fitting according to the present invention.
Figure 6B:
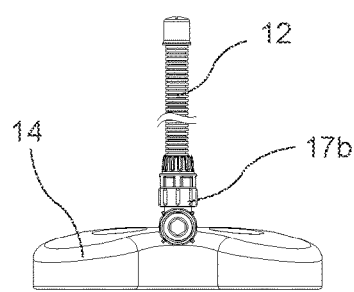
FIG. 6B is a side view of the single hose version of the toy for dogs with a female hose fitting according to the present invention.
Figure 6A:
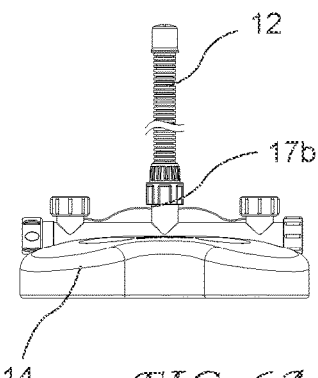
FIG. 6A is a front view of a single hose version of the toy for dogs with a female hose fitting according to the present invention.
Figure 6C:
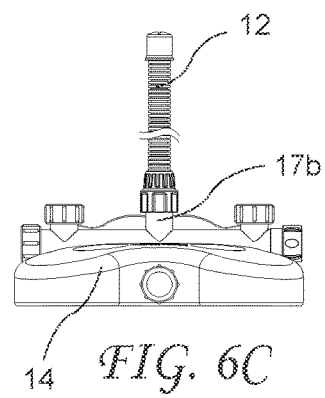
FIG. 6C is a rear view of the single hose version of the toy for dogs with a female hose fitting according to the present invention.
Figure 6E:
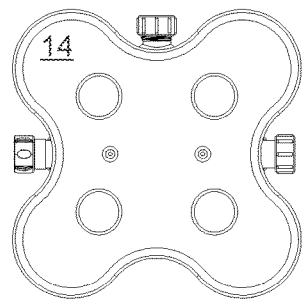
FIG. 6E is a bottom view of the single hose version of the toy for dogs with a female hose fitting according to the present invention.

FIG. 6A to 6E show the same base 14 configuration as FIG. 2A to 2E. FIG. 6A to 6C show a single hose configuration with a female hose fitting 17b.

Figure 7B:
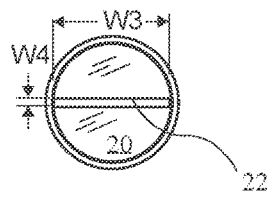
FIG. 7B is a top view of the fan nozzle according to the present invention.
Figure 7A:
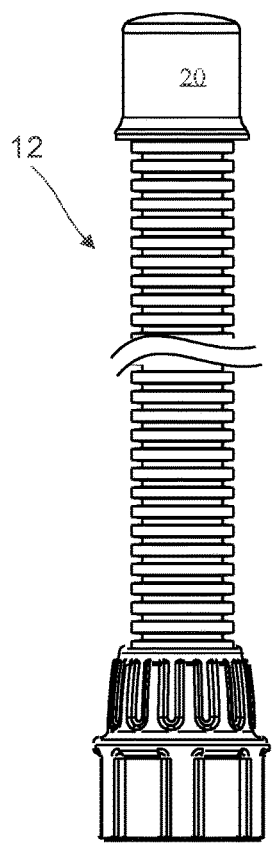
FIG. 7A is a side view of a hose and fan nozzle according to the present invention.

A side view of the hose 12 and fan nozzle 20 is shown in FIG. 7A and a top view of the fan nozzle 20 is shown in FIG. 7B. The fan nozzle 20 includes a mouth 22 having a width W4. W4 preferably is preferably about 1 mm. The fan nozzle 20 has a width W3. W3 preferably is preferably about 16 mm.

Figure 7C:
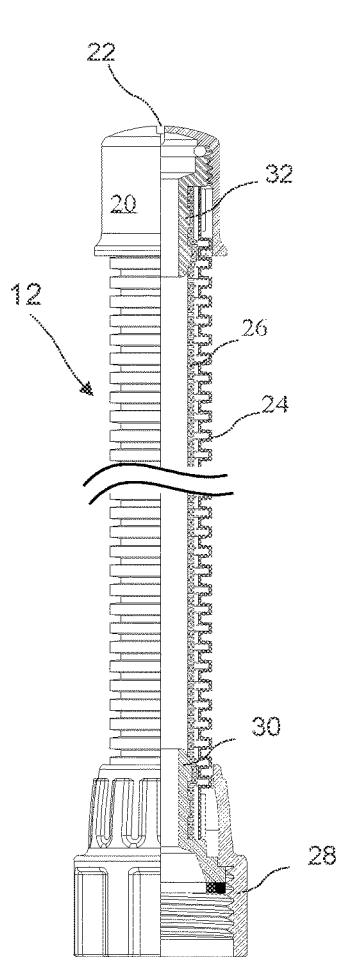
FIG. 7C is a cut away view of the hose and fan nozzle according to the present invention.

A cut away view of the hose 12 of the toy 10 is shown in FIG. 7C. The hose 12 includes a hose base fitting 28, a hose base insert 30 for capturing the bottom of the hose 12, and a nozzle insert 32 for capturing the top of the hose 12.

Figure 8:
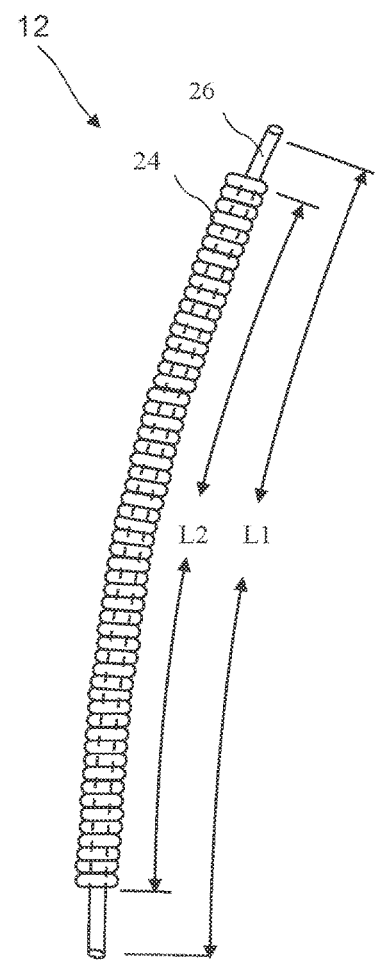
FIG. 8 is a side view of the hose according to the present invention.

A side view of the hose 12 is shown in FIG. 8. The hose 12 includes an inner hose 26 and an outer protective hose 24. An inner hose 24 is preferably a silicone tube preferably about 12 mm in outside diameter, and preferably about 2 mm thick, and with a length L1. The length L1 is preferably between 54 cm and 70 cm, and more preferably 64 cm. The outer protective hose 24 is preferably plastic flexible corrugated tubing having an outside diameter of preferably about 18 mm and thickness of preferably about 0.3 mm, and a length L2. The length L2 is preferably about 2.5 cm shorter than the length L1. The hoses 26 and 24 may be smaller than the 12 mm and 18 mm in diameter, but preferably not greater than the 12 mm and 18 mm in diameter to allow a desired motion. The hose 24 is preferably has a UV stabilizer added for long term outdoor durability.

While the invention herein disclosed has been described by means of specific embodiments and applications thereof, numerous modifications and variations could be made thereto by those skilled in the art without departing from the scope of the invention set forth in the claims.

I claim:

1. A dog toy, comprising:
   a base;
   a water inlet in fluid communication with a fluid passage of the base;
   at least one hose having a fixed end attached in fluid communication with the passage, the at least one hose between 54 cm and 70 cm long; and
   a nozzle attached to a free end of each of the at least one hose in fluid communication with the water source serially through the passage and the hose.

2. The toy of claim 1, wherein the at least one hose comprises one hose or two hoses.

3. The toy of claim 1, wherein the at least one hose is about 64 cm long.

4. The toy of claim 1, wherein the at least one hose comprises an inner hose and an outer hose, the inner hose in fluid communication with the passage.

5. The toy of claim 4, wherein the inner hose is a silicone tube.

6. The toy of claim 4, wherein the inner hose is 12 mm or less in outside diameter.

7. The toy of claim 5, wherein the outer hose is plastic hose protecting the inner hose.

8. The toy of claim 7, wherein the outer hose is plastic hose is a corrugated plastic hose.

9. The toy of claim 8, wherein:
the inner hose has a maximum diameter 12 mm; and
the outer hose has a maximum diameter of 18 mm.

10. The toy of claim 8, wherein:
the inner hose is about 12 mm in diameter; and
the outer hose is about 18 mm in diameter.

11. The toy of claim 1, wherein the hose further comprising:
a hose base fitting;
a hose base insert; and
a nozzle insert.

12. The toy of claim 11, wherein the hose base fitting is a female hose fitting.

13. The toy of claim 11, wherein the hose base fitting is a garden hose quick connect.

14. The toy of claim 1, wherein the nozzle is a fan nozzle having a wide mouth.

15. The toy of claim 1, wherein the fan nozzle has a mouth widths of about 16 mm by about 1 mm.

16. The toy of claim 1, wherein the fluid passage has an inlet end with a female garden hose fitting and an outlet end with a male garden hose fitting.

17. The toy of claim 1, wherein the base further includes a hollow inner base chamber that may be filled with water or sand to add weight to the base.

18. The toy of claim 1, wherein the base further includes a plurality of stake holes to firmly secure the base to a ground.

19. A dog toy, comprising:
a base having a hollow interior chamber that may be filled with water or sand;
a water inlet in fluid communication with a fluid passage of the base;
at least one hose having a fixed end attached in fluid communication with the passage, the at least one hose is between 54 cm and 70 cm long and comprising:
a silicone inner tube 12 mm or less outside diameter and about 2 mm thickness in fluid communication with the passage;
a protective corrugated plastic outer tube around the inner tube and 18 mm or less in outside diameter and about 0.3 mm thickness;
a quick release fitting engaged with the base;
a hose base fitting;
a hose base insert;
a nozzle insert; and
a nozzle attached to a free end of the at least one hose in fluid communication with the water source serially through the passage and the inner tube, and a nozzle mouth having a mouth widths of about 16 mm by about 1 mm.

20. A dog toy, comprising:
a base having a plurality of stake holes and a hollow inner chamber to receive water or sand;
a water inlet in fluid communication with a fluid passage of the base;
at least one hose having a fixed end attached in fluid communication with the passage, the at least one hose is about 64 mm long and comprising:
a silicone inner tube about 12 mm in outside diameter and about 2 mm in thickness in fluid communication with the passage;
a protective corrugated plastic outer tube around the inner tube, the outer tube about 18 mm in outside diameter and about 0.3 mm in thickness;
a female hose fitting;
a hose base insert;
a nozzle insert; and
a nozzle attached to a free end of the hose in fluid communication with the water source serially through the passage and the inner tube, and a nozzle mouth having mouth widths of about 16 mm by about 1 mm.

* * * * *